(12) United States Patent
Wang et al.

(10) Patent No.: US 7,999,336 B2
(45) Date of Patent: Aug. 16, 2011

(54) ST-RAM MAGNETIC ELEMENT CONFIGURATIONS TO REDUCE SWITCHING CURRENT

(75) Inventors: Dexin Wang, Eden Prairie, MN (US); Dimitar V. Dimitrov, Edina, MN (US); Song S. Xue, Edina, MN (US); Insik Jin, Eagan, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 554 days.

(21) Appl. No.: 12/108,706

(22) Filed: Apr. 24, 2008

(65) Prior Publication Data

US 2009/0268352 A1 Oct. 29, 2009

(51) Int. Cl.
*H01L 43/00* (2006.01)
*G11B 5/33* (2006.01)

(52) U.S. Cl. . 257/421; 257/422; 257/428; 257/E43.004; 257/E43.005; 257/E43.006; 360/324.1; 360/324.11; 360/324.12; 365/145; 365/158; 365/171

(58) Field of Classification Search .................. 257/421, 257/422, 428, E43.004, E43.005, E43.006; 360/324.1, 324.11, 324.12; 365/145, 158, 365/171
See application file for complete search history.

(56) References Cited

U.S. PATENT DOCUMENTS

| 6,532,164 | B2 | 3/2003 | Redon et al. |
| 6,700,753 | B2 | 3/2004 | Singleton et al. |
| 6,714,444 | B2 | 3/2004 | Huai et al. |
| 6,967,863 | B2 | 11/2005 | Huai |
| 6,992,359 | B2 | 1/2006 | Nguyen et al. |
| 6,995,959 | B2 | 2/2006 | Ju et al. |
| 7,006,375 | B2 | 2/2006 | Covington |
| 7,088,609 | B2 | 8/2006 | Valet |
| 2006/0049472 | A1 | 3/2006 | Diao et al. |
| 2009/0109581 | A1* | 4/2009 | Fukuzawa et al. ....... 360/324.12 |
| 2009/0180308 | A1* | 7/2009 | Inomata et al. ............... 365/145 |

OTHER PUBLICATIONS

Egelhoff, Jr., W.F., et al., "Oxygen as a surfactant in the growth of giant magnetoresistance spin valves", J. Appl. Phys. 82 (12), pp. 6142-615115 Dec. 1997.
Egelhoff, Jr., W.F., et al., "Specular electron scattering in metallic thin film", J. Vac. Sci. Techol. B 17(4), pp. 1702-1707, Jul./Aug. 1999.
Slonczewski, J.C., "Current-driven excitation of magnetic multilayers", Journal of Magnetism and Magnetic Materials, 159 (1996) pp. L1-L7.
Sun, L.Z., "Current-driven magnetic switching in manganite trilayer junctions", Journal of Magnetism and Magnetic Materials, 202 (19999), pp. 157-162.

* cited by examiner

*Primary Examiner* — Dao H Nguyen
(74) *Attorney, Agent, or Firm* — Fredrikson & Byron, P.A.

(57) ABSTRACT

In order to increase an efficiency of spin transfer and thereby reduce the required switching current, a current perpendicular to plane (CPP) magnetic element for a memory device includes either one or both of a free magnetic layer, which has an electronically reflective surface, and a permanent magnet layer, which has perpendicular anisotropy to bias the free magnetic layer.

12 Claims, 7 Drawing Sheets

ST-RAM MAGNETIC ELEMENT CONFIGURATIONS TO REDUCE SWITCHING CURRENT

BACKGROUND

Those skilled in the art know that spin transfer can be used as an alternative to, or in addition to, an external magnetic field in switching current perpendicular to plane (CPP) configurations of magnetic elements, otherwise known as ST-RAM cells, which may be either of the magnetic tunnel junction (MTJ) type or of the spin valve (SV) type. When a spin-polarized current passes through a free magnetic layer of a magnetic element, a portion of the spin angular momentum of the electrons incident on the free layer is transferred to the free layer. A spin transfer effect, that is caused by conduction electrons traveling from a reference magnetic layer of the magnetic element to the free magnetic layer, switches the magnetization orientation of the free layer from antiparallel, with the magnetization orientation of the reference layer, to parallel, with the magnetization orientation of the reference layer; and, a spin transfer effect that is caused by conduction electrons traveling in the opposite direction, switches the magnetization orientation of the free layer from parallel with the magnetization orientation of the reference layer back to antiparallel.

The free magnetic layer should be thick enough, compared with the spin diffusion length (SDL), to allow for efficient spin torque transfer from the spin polarized current passing therethrough. For a free magnetic layer formed by a NiFeCo alloy, the SDL for efficient spin torque transfer is on the order of 100 nm, yet a typical thickness of this free layer is approximately 5 nm or less. Those skilled in the art will appreciate that increasing a thickness of this free layer is not a desirable option, since the switching current requirement is proportional to the thickness of the layer; in addition, a thicker free magnetic layer creates a larger fringe magnetic field that can interfere with neighboring elements, particularly in a densely packed memory system. Thus, the present disclosure pertains to magnetic elements, or ST-RAM cells, having configurations facilitating a relatively dense packing of the elements and a relatively low switching current for the elements.

BRIEF SUMMARY

A current perpendicular to plane (CPP) magnetic element for a memory device, according to some embodiments of the present disclosure, includes a free magnetic layer, which has an electronically reflective surface. According to some alternate embodiments, a CPP magnetic element includes a permanent magnet layer, which has perpendicular anisotropy, in order to bias a free magnetic layer of the magnetic element. According to yet further embodiments, a CPP magnetic element includes both a reflective surface of the free magnetic layer, and the permanent magnet layer having perpendicular anisotropy.

BRIEF DESCRIPTION OF THE DRAWINGS

The following drawings are illustrative of particular embodiments of the disclosure and therefore do not limit the scope. The drawings are not to scale (unless so stated) and are intended for use in conjunction with the explanations in the following detailed description. Embodiments of the disclosure will hereinafter be described in conjunction with the appended drawings, wherein like numerals denote like elements.

DETAILED DESCRIPTION

The following detailed description is exemplary in nature and is not intended to limit the scope, applicability, or configuration in any way. Rather, the following description provides practical illustrations for implementing exemplary embodiments.

Figure 1:
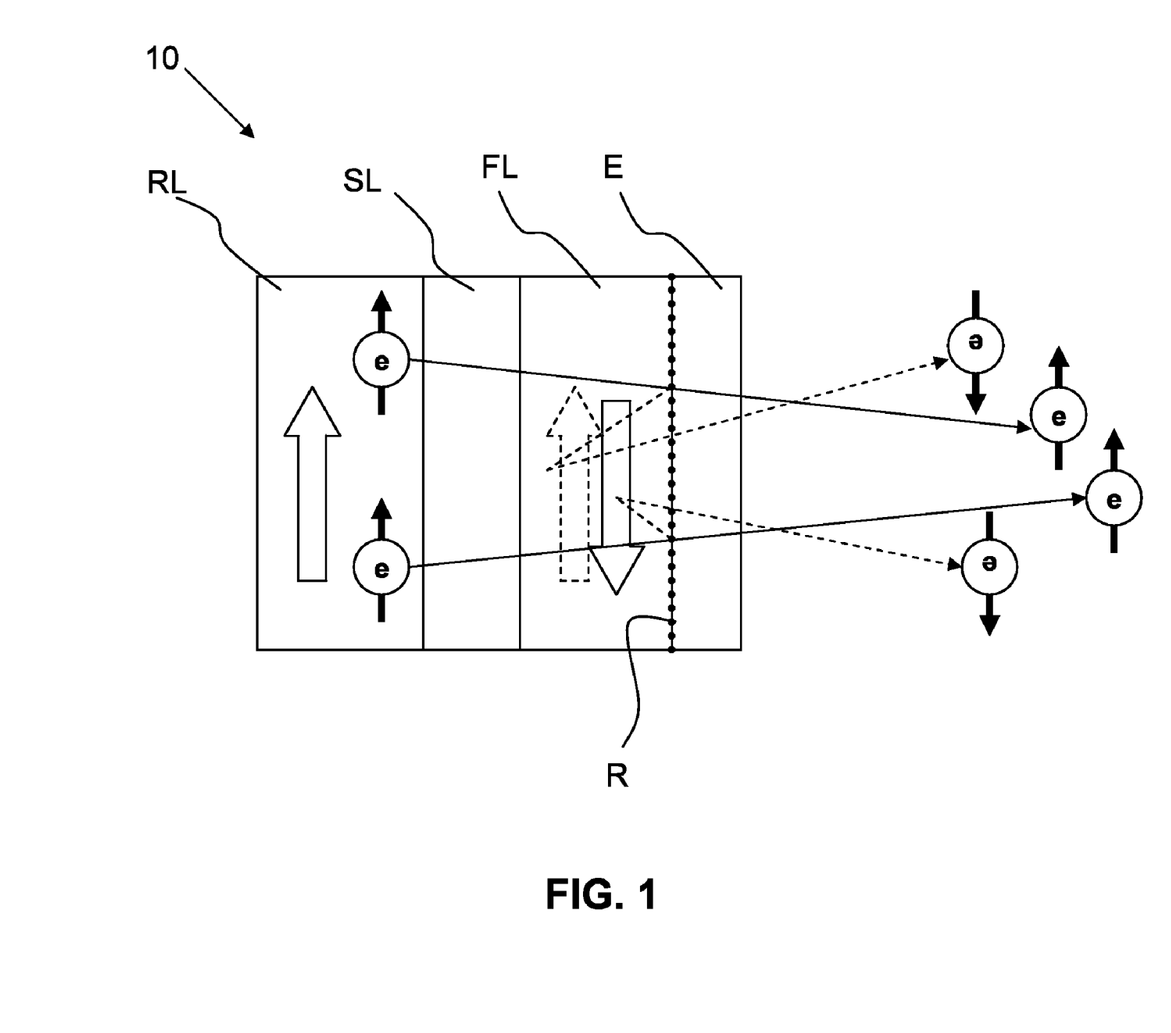
FIG. 1 is a diagram of a CPP magnetic element, which schematically depicts conduction electrons of a switching current passing therethrough, and an effect of an electronically reflective surface incorporated therein, according to some embodiments of the present disclosure.
Figure 4:
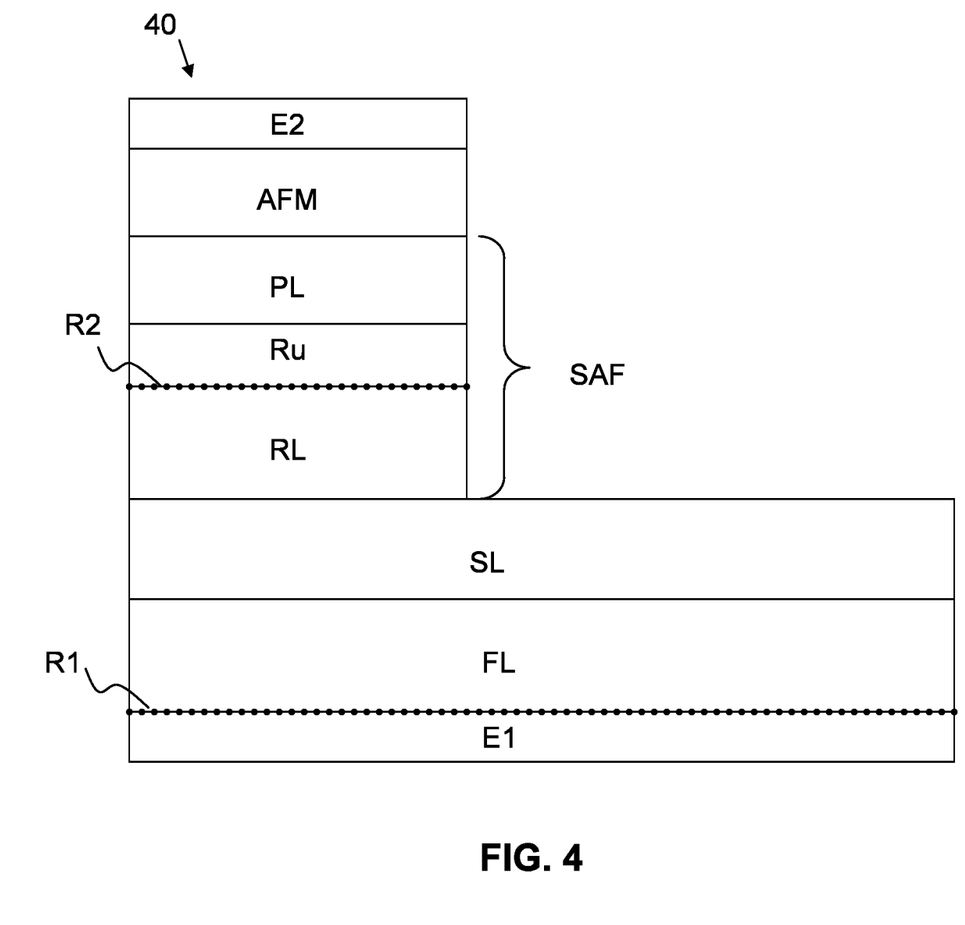
FIG. 4 is a diagram of a CPP magnetic element incorporating a pair of electronically reflective surfaces, according to some other embodiments.
Figure 5:
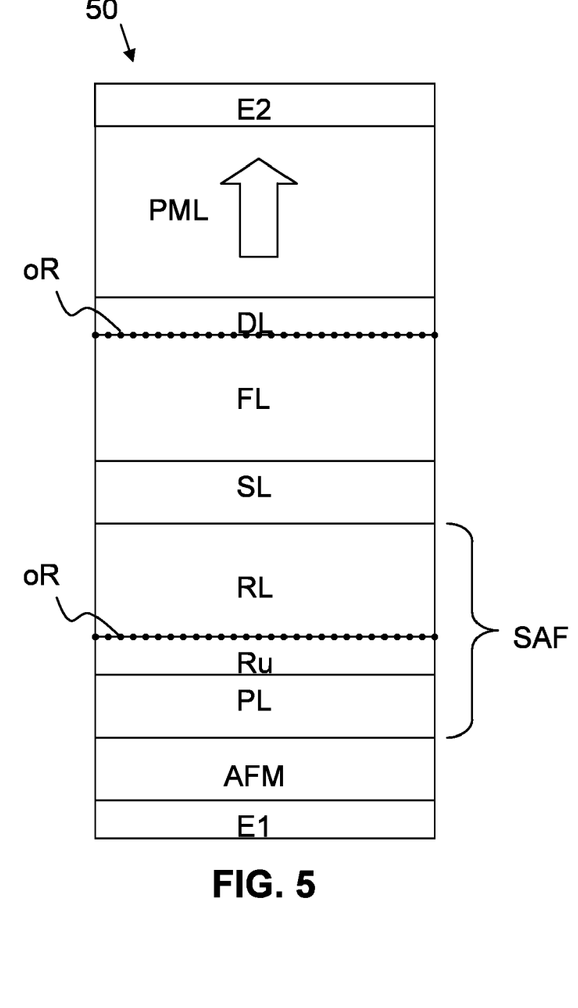
FIG. 5 is a diagram of a CPP magnetic element incorporating a permanent magnet layer, according to some alternate embodiments of the present disclosure.
Figure 6:
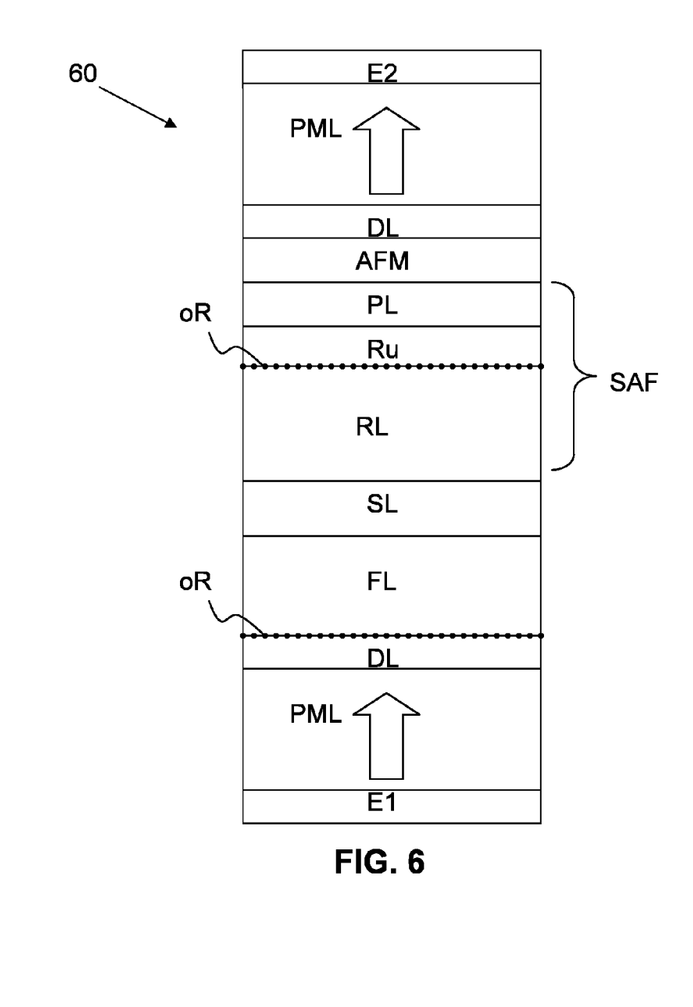
FIG. 6 is a diagram of a CPP magnetic element incorporating a pair of permanent magnet layers, according to yet further embodiments.

FIG. 1 is a diagram of a CPP magnetic element 10, which schematically depicts conduction electrons e of a switching current passing therethrough, and an effect of an electronically reflective surface R incorporated therein, according to some embodiments of the present disclosure. FIG. 1 illustrates element 10 including a free magnetic layer FL, for example, comprised of NiFeCo, separated from a reference magnetic layer RL, for example, comprised of CoFe, by a spacer layer SL, for example, an insulative tunnel barrier comprised of MgO, $Al_2O_3$ or $TiO_2$. An upward pointing arrow, shown within layer RL, depicts the pinned magnetization orientation of layer RL, while a downward pointing arrow, shown within layer FL, depicts a magnetization orientation of layer FL, which is antiparallel with that of layer RL, but may be switched to be parallel, as depicted by the upward pointing arrow shown with dashed lines within layer FL. FIG. 1 further illustrates a conductive layer, or electrode E overlaying a side of layer FL which is opposite layer SL; although not shown, a similar conductive layer/electrode E may overlay layer RL on a side opposite layer SL. Layer RL would typically be located in proximity to a bottom of the stack of layers, with layer SL, layer FL and layer E having been successively formed thereover, for example, as shown in FIGS. 2A-B, 3 and 5; however a reverse sequence is an option, for example, as shown in FIGS. 4 and 6. Electrodes E may be comprised of any suitable conductive material, for example, Cu, W, Al or TiN, for the purpose of electrically coupling element 10 to other elements of a circuit chip in which element 10 is included. Those skilled in the art will appreciate that when electrode E is a top layer, a capping layer is a portion thereof, and, when electrode E is a bottom layer, a seed layer is a portion thereof. Those skilled in the art will further appreciate that layer RL may comprise a single ferromagnetic layer, or may include multiple layers, for example, a pair of ferromagnetically coupled ferromagnetic layers, an antiferromagnetic (AFM) pinning layer and a ferromagnetic pinned layer, a synthetic antiferromagnetic (SAF), or an SAF with an antiferromagnetic layer.

Two representative spin-up conduction electrons e, of a plurality of spin-up conduction electrons of a switching current are shown traveling, from left to right, through magnetic element 10, according to two different paths. As previously described above, a thickness of layer FL is preferably on the order of 5 nm or less, so that the thickness of layer FL does not provide an adequate SDL to allow enough of the plurality of electrons of the switching current to be spin-flipped for an efficient spin torque transfer effect to switch layer FL; electrons e, when traveling along the path indicated by the solid line arrow of FIG. 1, are representative of those electrons which are not spin-flipped. However, FIG. 1 further illustrates, with a dotted line, an electronically reflective surface R of layer FL, according to some embodiments of the present disclosure, which reflects electrons e back into layer FL, per the dashed line arrow, so that the equivalent thickness of layer FL is effectively increased to cause electrons e to be spin-flipped from spin-up to spin-down, as indicated at the termination of the dashed line arrow paths, thereby increasing the efficiency of the spin torque transfer effect. Although not shown, it should be understood many spin-down conduction electrons, of a reversed switching current, which electrons travel in the reverse direction (right to left, layer FL to layer RL), are 'bounced back' into layer FL, due to a smaller tunnel probability of layer SL. Within layer FL, enough of these spin-down electrons are spin-flipped to effect a switching of the magnetization orientation of layer FL back to anti-parallel with that of layer RL; the efficiency for this switching is also increased by reflective surface R.

Reflective surface R may be formed on layer FL via a low energy ion bombardment process (i.e. sputtering), which is known to those skilled in the art; suitable materials for forming surface R are conductive and include, without limitation, Copper (Cu), Gold (Au), Ruthenium (Ru), Platinum (Pt), Bismuth (Bi), Niobium (Nb) and Chromium (Cr), Hafnium (Hf) and Zirconium (Zr), as well as conductive oxides such as $RuO_2$, $IrO_2$ and $CoFeO_x$. According to preferred embodiments, reflective surface R is formed to be as atomically flat, or smooth, as possible, in order to approach perfect specular reflection, however such a specular reflective surface is not essential. It should be noted that reflective surface R is preferably not 100% reflective to allow passage of the current therethrough. According to some embodiments, the layer forming electrode E is also reflective.

A particular process which may be used to form reflective surface R is described by Egelhoff et al. in their article entitled: "Oxygen as a surfactant in the growth of giant magnetoresistive spin valves" (J. Appl. Phys. 82 (12), 15 Dec. 1997). On page 6149 of the article, Egelhoff et al. describe forming a capping layer on a bottom spin valve sample by exposing the top Co layer of the sample to ~$10^{-4}$ Torr·s of $O_2$ to produce ~0.4 nm CoO, depositing ~0.4 nm Ta, and exposing the sample to air to oxidize the Ta. The giant magnetoresistance (GMR) and resistance demonstrated by spin valves incorporating such a capping layer suggest to Egelhoff et al. an increase in specular scattering due to the capping layer.

Figure 2A:
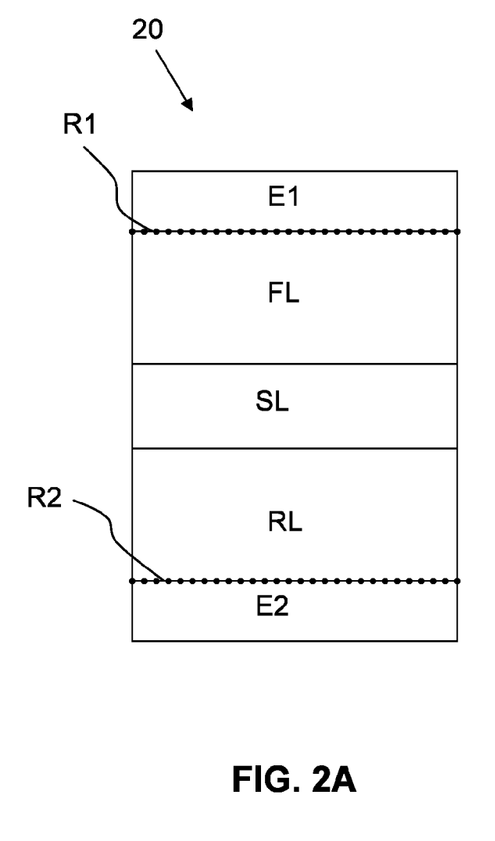
FIGS. 2A-B are diagrams of CPP magnetic elements incorporating a pair of electronically reflective surfaces, according to some embodiments.
Figure 2B:
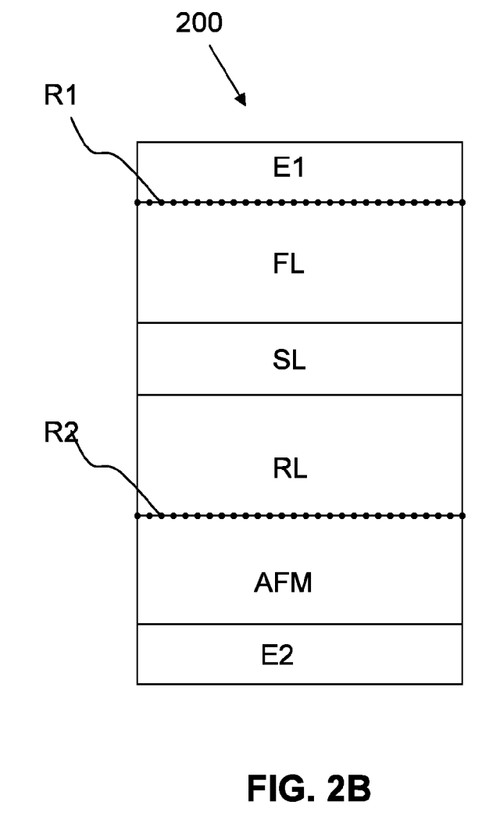

FIGS. 2A-B are diagrams of CPP magnetic elements 20 and 200, respectively, which incorporate a pair of electronically reflective surfaces R1, R2, according to some embodiments. Reflective surfaces R1 and R2 may be formed of any of the materials previously listed for surface R of element 10 and may be formed according to methods previously described. FIGS. 2A-B illustrate elements 20, 200 including reference magnetic layer RL separated from free magnetic layer FL by spacer layer SL, as previously described for element 10; reflective surface R1 is formed on free layer FL and interfaces with a first electrode E1, and, according to FIG. 2A, reflective surface R2 is formed over a second electrode E2, and interfaces with layer RL, while, according to FIG. 2B, reflective surface R2 is formed over an antiferromagnetic layer AFM and interfaces with layer RL.

Figure 3:
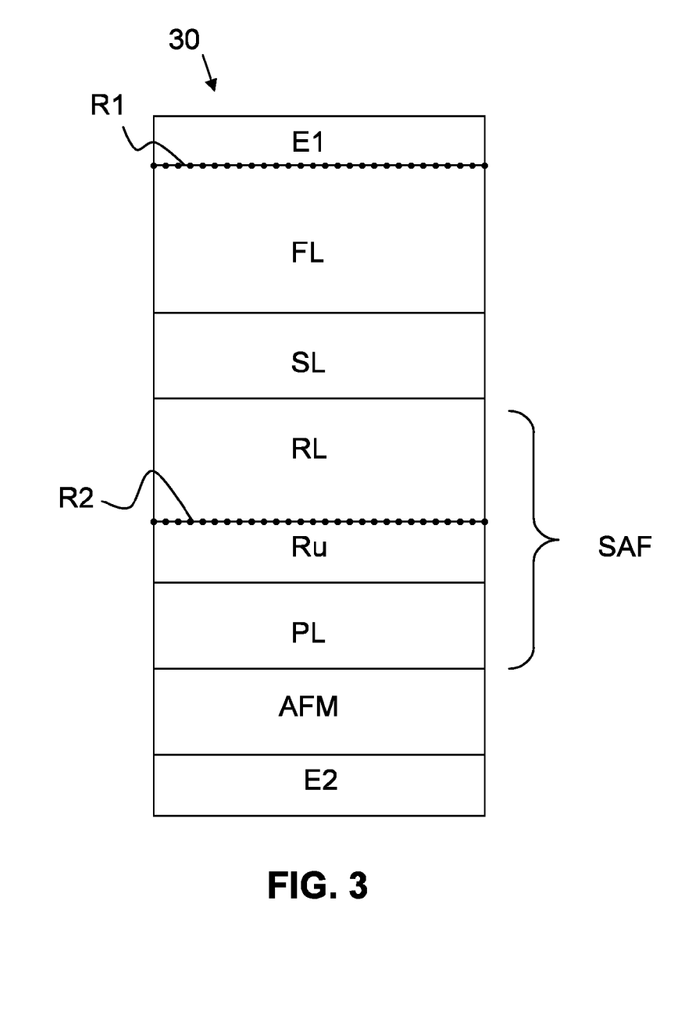
FIG. 3 is a diagram of a CPP magnetic element incorporating a pair of electronically reflective surfaces, according to further embodiments.

FIG. 3 is a diagram of another magnetic element 30 which incorporates the pair of electronically reflective surfaces R1, R2. FIG. 3 shows a location of reflective surface R1 and an arrangement of electrode E1, layer FL, layer SL, layer RL, and layer AFM being similar to that depicted for element 200 of FIG. 2B; however, element 30 differs from element 200 in that element 30 incorporates a synthetic antiferromagnetic (SAF) composed of a Ruthenium layer Ru interposed between a pinned layer PL and layer RL, wherein layer Ru forms second reflective surface R2. It should be noted that the stack configuration of element 30 may be reversed, or flipped, for example, as shown in FIG. 4.

FIG. 4 is a diagram of a CPP magnetic element 40, which incorporates electronically reflective surfaces R1, R2, according to some other embodiments. FIG. 4 illustrates electrode E1 of element 40 as the bottom electrode and reflective surface R1 of layer FL formed over electrode E1. FIG. 4 further illustrates layer SL, layer FL, surface R1 and electrode E1 extending sideways beyond a perimeter of the overlying layers of element 40, in order to enable use of a lateral electrical connection.

Another group of embodiments of the present disclosure incorporates an in-stack perpendicular bias; the bias helps to start the switching of the magnetization orientation of the free layer when a switching current is applied, so that a relatively lower switching current may be effective. FIGS. 5 and 6 are diagrams of CPP magnetic elements 50, 60, according to several embodiments, that include at least one permanent magnet layer PML. FIGS. 5 and 6 both illustrate a free magnetic layer FL of each element 50, 60 separated from a reference magnetic layer RL by a non-magnetic spacer layer SL, and permanent magnet layer PML separated from free layer FL by a relatively thin conductive exchange decoupling layer DL; a pinned layer PL is shown located on a side of reference layer RL opposite that of permanent magnet layer PML and separated from layer RL by a Ruthenium layer Ru to form an SAF. FIG. 6 further illustrates element 60 including a second permanent magnet layer PML, which is separated from an antiferromagnetic layer AFM, adjacent to SAF, by another decoupling layer DL, such that reference layer RL, spacer layer SL and free layer FL are located between the two permanent magnet layers PML.

Both of elements 50, 60 are shown including first and second electrodes E1 and E2 terminating either end of the stack, bottom and top, respectively. Although FIG. 5 illustrates layer PML and associated decoupling layer DL near the top of the stack, in proximity to electrode E2, it should be appreciated that an order of RL, SL and FL layers may be reversed and that layers PML and DL may alternately be located near a bottom of the stack, in proximity to electrode E1, such that layer AFM is positioned near the top, between electrode E2 and SAF—this alternate configuration is indicated with labels on right hand side of the stack in FIG. 5.

Figure 7:
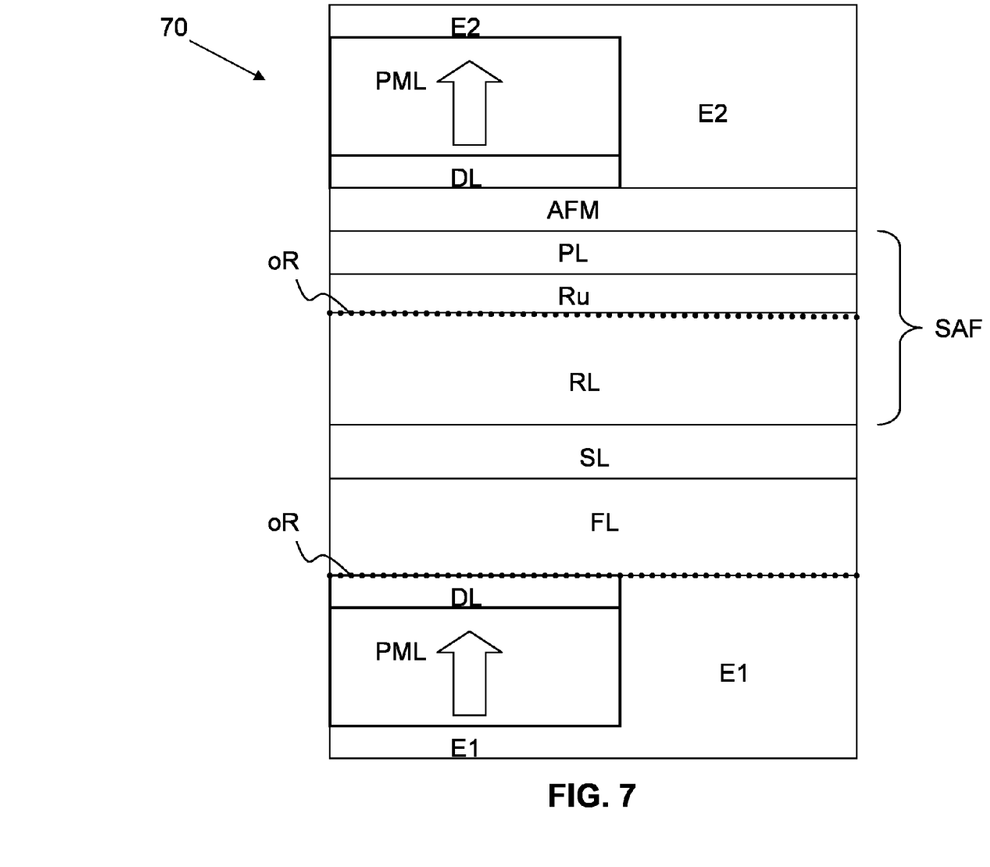
FIG. 7 is a diagram of a CPP magnetic element incorporating the pair of permanent magnetic layers, according to alternate embodiments.

According to the illustrated embodiments, each permanent magnet layer PML has a perpendicular anisotropy, which is indicated by the upward pointing arrow, in order to produce a biasing field that facilitates switching. Some examples of suitable materials for layer PML include, without limitation, CoPt, TbCoFe and CoPd; and some examples of suitable materials for decoupling layer DL include, without limitation, Ta, Ru, Ta/Ru and Cu. A thickness of layer PML may from tens of nanometers to many micrometers, while a thickness of layer DL may be from one nanometer to many micrometers. Although FIGS. 5 and 6 show layer PML as a mono-layer, for example, formed from any of the previously cited materials, according to some alternate embodiments of the disclosure, Co/Pt or Co/Ni multi-layers, having perpendicular anisotropy, are incorporated for layer PML. Furthermore, according to some alternate embodiments, decoupling layer DL is insulative, for example, comprising $SiO_2$ or $Al_2O_3$; and FIG. 7 illustrates a stack 70, modified from stack 60, which employs insulative decoupling layers DL, and wherein electrodes E1, E2 extend alongside respective layers PML and DL in order to make conductive contact with layer FL and layer AFM, respectively. Spacer layer SL may be insulative (a tunnel barrier having a relatively high magneto-resistive effect), for example, formed from MgO, $Al_2O_3$, or $TiO_2$, or conductive, or spacer layer may form a current constrictive path (CCP), for example, being composed of Cu filaments embedded in an insulating matrix of $Al_2O_3$.

FIGS. 5 and 6 further illustrate optional electronically reflective surfaces oR which may be incorporated to further facilitate switching as previously described for the embodiments of FIGS. 1-3. Thus, a third group of embodiments are formed by incorporation of both an in-stack biasing layer and one or two electronically reflective surfaces oR. With reference to FIG. 5, reflective surface oR of free layer FL, preferably NiFeCo, may be formed by any of the materials as previously described for surface R: Au, Pt, Nb, Hf, Cr, Cu, Bi, Cr and Zr, as well as conductive oxides such as $RuO_2$, $IrO_2$ and $CoFeO_x$. FIG. 5 also shows ruthenium layer Ru forming an optional reflective surface oR.

In the foregoing detailed description, embodiments of the disclosure have been described. These implementations, as well as others, are within the scope of the appended claims.

The invention claimed is:

1. A current perpendicular to plane (CPP) magnetic element for a memory device, the magnetic element comprising:
    a free magnetic layer separated from a reference magnetic layer by an insulative non-magnetic spacer layer; wherein the free magnetic layer has an electronically reflective surface; and
    a first conductive layer overlaying a side of the free magnetic layer, which side is opposite the spacer layer;
    wherein the electronically reflective surface of the free magnetic layer interfaces with the first conductive layer.

2. The element of claim 1, wherein the surface of the free magnetic layer comprises a material selected from the group consisting of: Au, Pt, Nb, Hf, Cr, Cu, Bi, Cr, Zr, $RuO_2$, $IrO_2$ and $CoFeO_x$.

3. The element of claim 1, further comprising:
    a second conductive layer, the second conductive layer overlaying a side the reference magnetic layer, which side is opposite the spacer layer;
    wherein the second conductive layer is electronically reflective and interfaces with the reference magnetic layer.

4. The element of claim 3, wherein the second conductive layer is an electrode.

5. The element of claim 3, wherein the second conductive layer is an antiferromagnetic layer.

6. The element of claim 1, wherein the free magnetic layer comprises NiFeCo.

7. The element of claim 1, further comprising:
    a pinned layer overlaying a side of the reference magnetic layer, which side is opposite the spacer layer;
    wherein the pinned layer is separated from the reference magnetic layer by a layer of RU which forms an electronically reflective surface.

8. The element of claim 1, wherein the conductive layer, the free magnetic layer and the spacer layer extend sideways beyond a perimeter of the reference layer.

9. A CPP magnetic element for a memory device, the magnetic element comprising:
    a free magnetic layer separated from a reference magnetic layer by a non-magnetic spacer layer; wherein the free magnetic layer has an electronically reflective surface; and
    a first permanent magnet layer separated from the free layer by a first conductive exchange decoupling layer and located on a side of the free layer which is opposite the spacer layer; and
    a second permanent magnet layer separated from the reference layer by at least a second conductive exchange decoupling layer and located on a side of the reference magnetic layer which is opposite the free layer; and
    wherein the first and second permanent magnet layers have perpendicular anisotropy for biasing the free layer; and
    wherein the electronically reflective surface of the free magnetic layer interfaces with the first conductive exchange decoupling layer.

10. The element of claim 9, further comprising:
    a pinned layer overlaying a side of the reference magnetic layer, which side is opposite the spacer layer;
    wherein the pinned layer is separated from the reference magnetic layer by layer of RU which forms an electronically reflective surface.

11. The element of claim 9, wherein at least one of the first and second permanent magnet layers is a monolayer of a particular material.

12. The element of claim 9, wherein at least one of the first and second permanent magnet layers comprises multiple layers of materials.

* * * * *